US012566539B1

(12) United States Patent
Swerdlow

(10) Patent No.: US 12,566,539 B1
(45) Date of Patent: Mar. 3, 2026

(54) PRIVILEGED INSTANT ONE-ON-ONE VIDEO SESSIONS

(71) Applicant: Zoom Communications, Inc., San Jose, CA (US)

(72) Inventor: Aleksandra Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 199 days.

(21) Appl. No.: 18/467,844

(22) Filed: Sep. 15, 2023

(51) Int. Cl.
*G06F 3/0484* (2022.01)
*G06F 3/0481* (2022.01)
*H04L 65/1069* (2022.01)

(52) U.S. Cl.
CPC .......... *G06F 3/0484* (2013.01); *G06F 3/0481* (2013.01); *H04L 65/1069* (2013.01)

(58) Field of Classification Search
CPC ... G06F 3/0484; G06F 3/0481; H04L 65/1069
See application file for complete search history.

(56) References Cited

U.S. PATENT DOCUMENTS

| | | | | |
|---|---|---|---|---|
| 9,374,394 | B2 * | 6/2016 | Kahn ..................... | G06Q 10/10 |
| 9,876,831 | B1 | 1/2018 | Leske | |
| 10,681,307 | B2 | 6/2020 | Wood et al. | |
| 2003/0074451 | A1 | 4/2003 | Parker et al. | |
| 2003/0182428 | A1 | 9/2003 | Li et al. | |
| 2004/0010808 | A1 | 1/2004 | deCarmo | |
| 2012/0287224 | A1 | 11/2012 | Paris | |

| | | | | |
|---|---|---|---|---|
| 2013/0162750 | A1 * | 6/2013 | Nerst .................. | H04L 65/4015 |
| | | | | 348/14.02 |
| 2015/0229882 | A1 * | 8/2015 | Liu ............................ | G06T 5/70 |
| | | | | 348/14.08 |
| 2015/0312176 | A1 | 10/2015 | Jones et al. | |
| 2015/0358577 | A1 * | 12/2015 | Zhou ...................... | H04N 7/147 |
| | | | | 348/14.01 |
| 2023/0199042 | A1 * | 6/2023 | Benson ................. | H04L 65/403 |
| | | | | 709/204 |

OTHER PUBLICATIONS

Zoom Support, Using Zoom Huddles, https://support.zoom.us/hc/en-us/articles/11679668406541-Using-Zoom-Huddles-, Mar. 31, 2023, 3 pages.
Zoom Support, Zoom Huddles FAQ, https://support.zoom.us/hc/en-us/articles/11679687591693-Zoom-Huddles-FAQ, Mar. 27, 2023, 3 pages.

* cited by examiner

*Primary Examiner* — Olisa Anwah
(74) *Attorney, Agent, or Firm* — Young Basile Hanlon & MacFarlane, P.C.

(57) ABSTRACT

A user interface that enables a first user to transmit text-based chat messages to a second user is activated. The user interface can be activated in response to a user input received at a first device associated with the first user. In response to activating the user interface, a video stream representative of the second user an received from a second device associated with the second user is displayed at the first device. In an example, an indication that the first user is engaged with another user in a one-on-one video session may be displayed in the user interface. In an example, an indication of a number of other users waiting to have one-on-one video sessions with the second user may be displayed in the user interface.

20 Claims, 14 Drawing Sheets

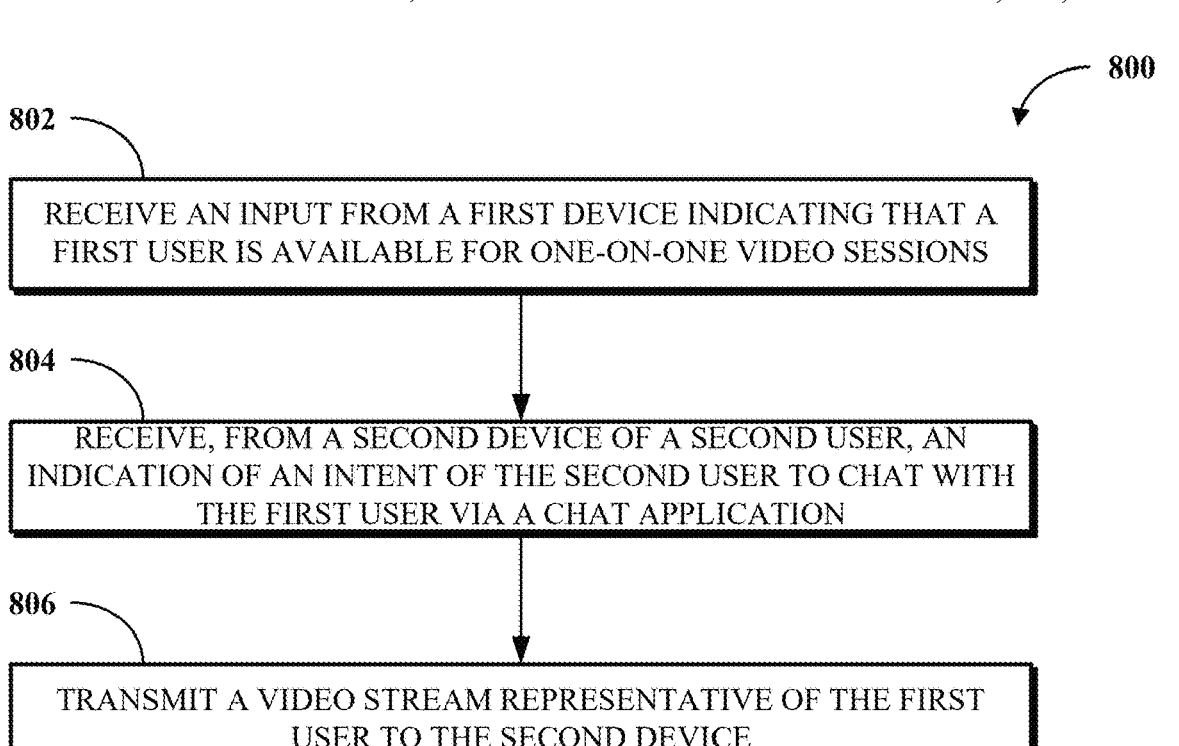

802 —

RECEIVE AN INPUT FROM A FIRST DEVICE INDICATING THAT A FIRST USER IS AVAILABLE FOR ONE-ON-ONE VIDEO SESSIONS

804 —

RECEIVE, FROM A SECOND DEVICE OF A SECOND USER, AN INDICATION OF AN INTENT OF THE SECOND USER TO CHAT WITH THE FIRST USER VIA A CHAT APPLICATION

806 —

TRANSMIT A VIDEO STREAM REPRESENTATIVE OF THE FIRST USER TO THE SECOND DEVICE

FIG. 8

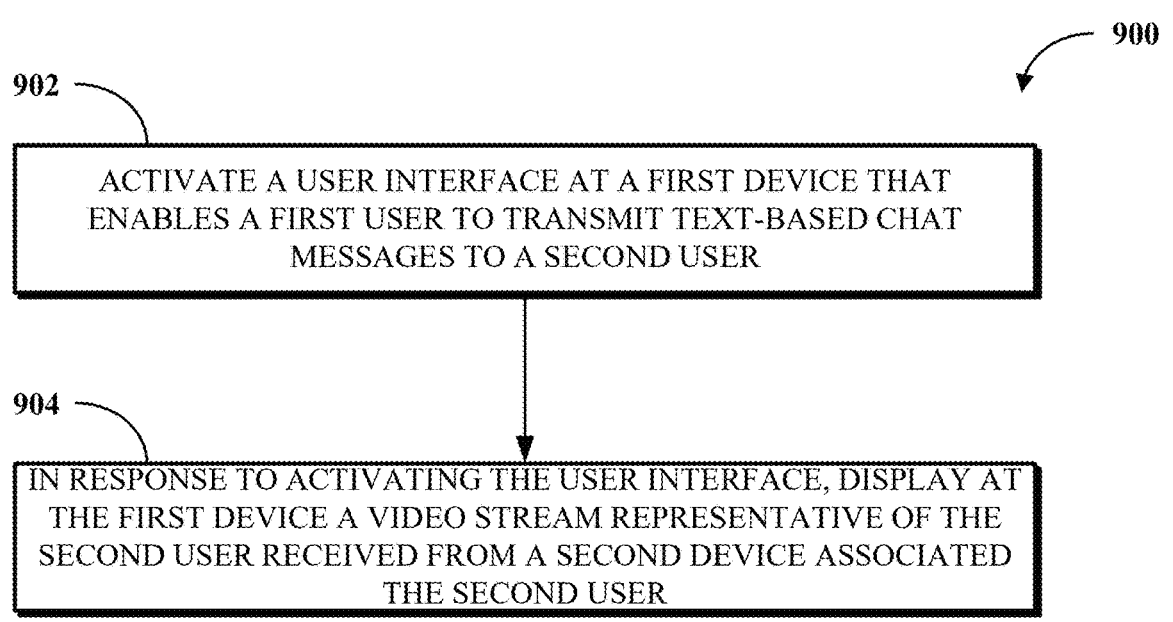

902 —

ACTIVATE A USER INTERFACE AT A FIRST DEVICE THAT ENABLES A FIRST USER TO TRANSMIT TEXT-BASED CHAT MESSAGES TO A SECOND USER

904 —

IN RESPONSE TO ACTIVATING THE USER INTERFACE, DISPLAY AT THE FIRST DEVICE A VIDEO STREAM REPRESENTATIVE OF THE SECOND USER RECEIVED FROM A SECOND DEVICE ASSOCIATED THE SECOND USER

FIG. 9

PRIVILEGED INSTANT ONE-ON-ONE VIDEO SESSIONS

FIELD

This disclosure generally relates to communication session, and, more specifically, to instant one-on-one video sessions.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8 is a flowchart of an example of a technique for instant one-on-one video sessions.

FIG. 9 is a flowchart of an example of another technique for instant one-on-one video sessions.

DETAILED DESCRIPTION

Figure 1:
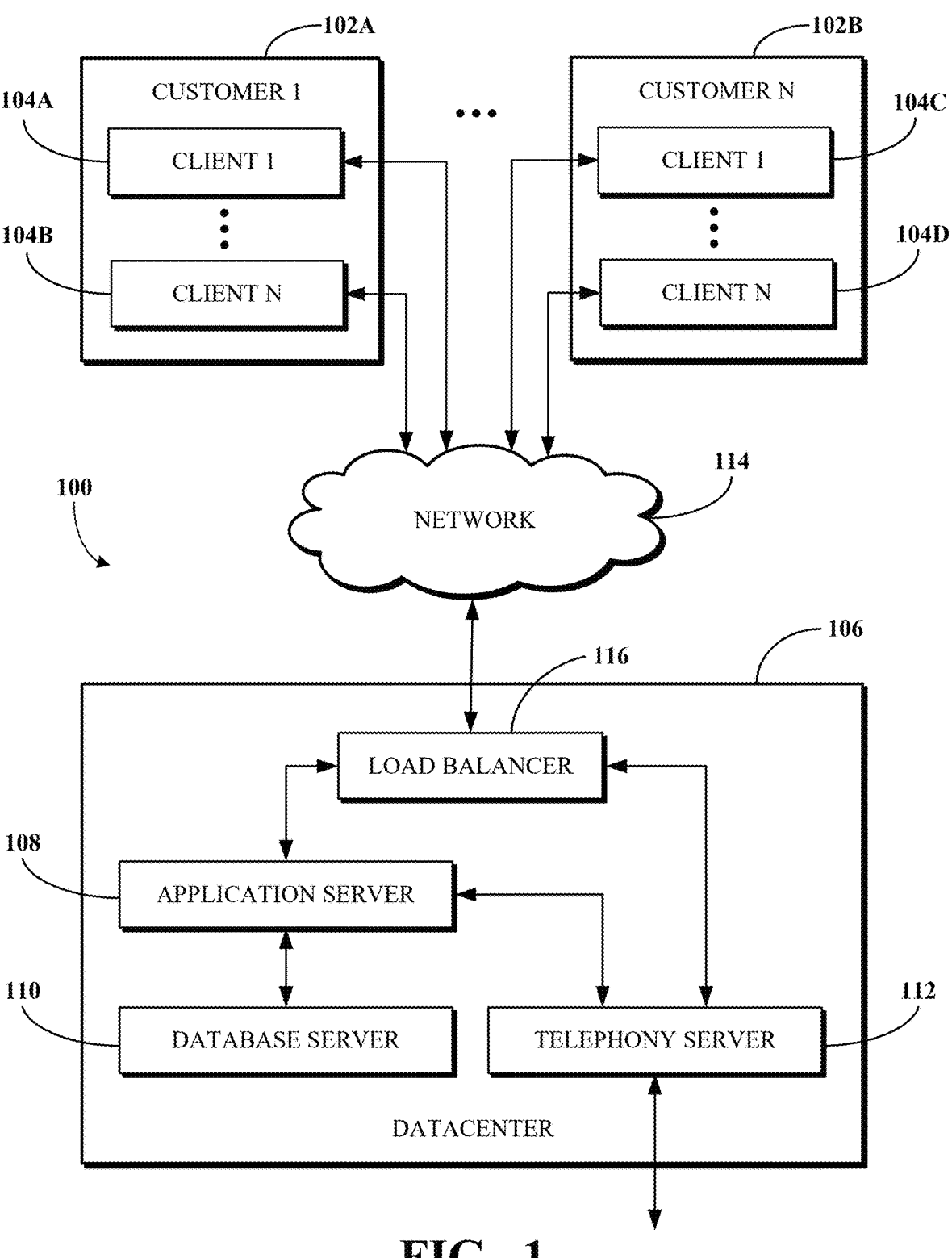
FIG. 1 is a block diagram of an example of an electronic computing and communications system.

Conferencing software and messaging software enable communication between users using different modalities, These software may be standalone products or may be integrated in a software platform, such as a unified communications as a service (UCaaS) platform. The conferencing software facilitates video conferences among participants across different locations. Some participants connect remotely, while others may be in a physical conference room or office. The messaging software provides instant text-based communication, allowing users to exchange text messages in real-time.

In an office environment, the dynamics of interaction often extend beyond the confines of structured meetings and formal communication channels enabled by a conventional UCaaS. It's not uncommon for colleagues, managers, and team members to spontaneously pop into each other's work areas to ask a quick question, to seek clarification on a task, or simply to engage in a light-hearted chat to break the monotony of work. Many managers encourage such direct interactions through open-door policies. Such impromptu interactions enable and facilitate the collaborative spirit that thrives in office settings. They foster a sense of camaraderie and mutual support. Moreover, these casual and instantaneous interactions often serve as a breeding ground for innovative ideas.

In the virtual world, chat messages and impromptu video conferences enabled by conventional UCaaS platform services and initiated by one party are the closest attempts to replicate the spontaneity of in-person, open-door, types of interactions. However, such interactions do not come close enough and have limitations. For example, some users may hesitate to initiate chat messages, fearing they might disturb the other party. Relatedly, video conferences require time to set up and may require pre-planning, preventing spontaneous interactions of the type described above. Additionally, typical chat experiences lack a sense of connection. The asynchronous nature of messaging means that users can choose when to respond to each other instead of having a maintained presence that they would have during a real dialog. This lack of synchronous interaction can contribute to the feeling of disconnection in typical chat experiences, where the conversation is often an endless stream of text, which can feel impersonal to users.

Implementations of this disclosure address problems such as these by enabling a user (referred to herein as a contactable user) to indicate their availability for instant (e.g., immediate) one-on-one video sessions with other users (referred to herein as contacting users). A contacting user can be a user privileged (e.g., configured or authorized) by the contactable user to engage in one-on-one video communication session with the contactable user. When a contacting user navigates to a chat application to send a chat message to the contactable user, a video stream associated with the contactable user is automatically shown, and an audio channel may be opened between the devices of the two users. As such, the contacting user can start talking to the contactable user without any additional steps or hesitation. Via a status indicator of the contactable user, a contacting user can be notified that the contactable user is currently available for instant one-on-one video communication via video. The contactable user and the contacting user can then immediately start a conversation via a video communication session.

In a situation where multiple contacting users want to chat with the contactable user, a queue system may be implemented. In some implementations, ranking criteria may be used to determine the order of communication (e.g., the order of the queued contacting users). While the contactable user is engaged with another user, the queued users may be shown a blurred video stream of the contactable user.

A contactable user may also be referred to herein as an "open door contactable user" or a "receiving user." A contacting user may also be referred to herein as a "privileged user" or an "initiating user" since such a user initiates the communication (or the intent to communicate) with a receiving or contactable user.

The term "one-on-one" used to describe the instant communication sessions in this context does not necessarily imply that there is only one user or participant from each client connected to the communication session. Instead, it signifies that two clients or devices are connected in a video communication session. To illustrate, consider two users, where one of them initiates the communication session via their client. These two users might physically be in the same location while interacting with a third user who could be in a different location. Furthermore, as described herein, although a communication session may begin as a one-on-one video communication session, it can evolve to include additional users. In other words, other user devices may join the initially one-on-one video communication session.

To describe some implementations in greater detail, reference is first made to examples of hardware and software structures used to implement a system for instant one-on-one video sessions. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
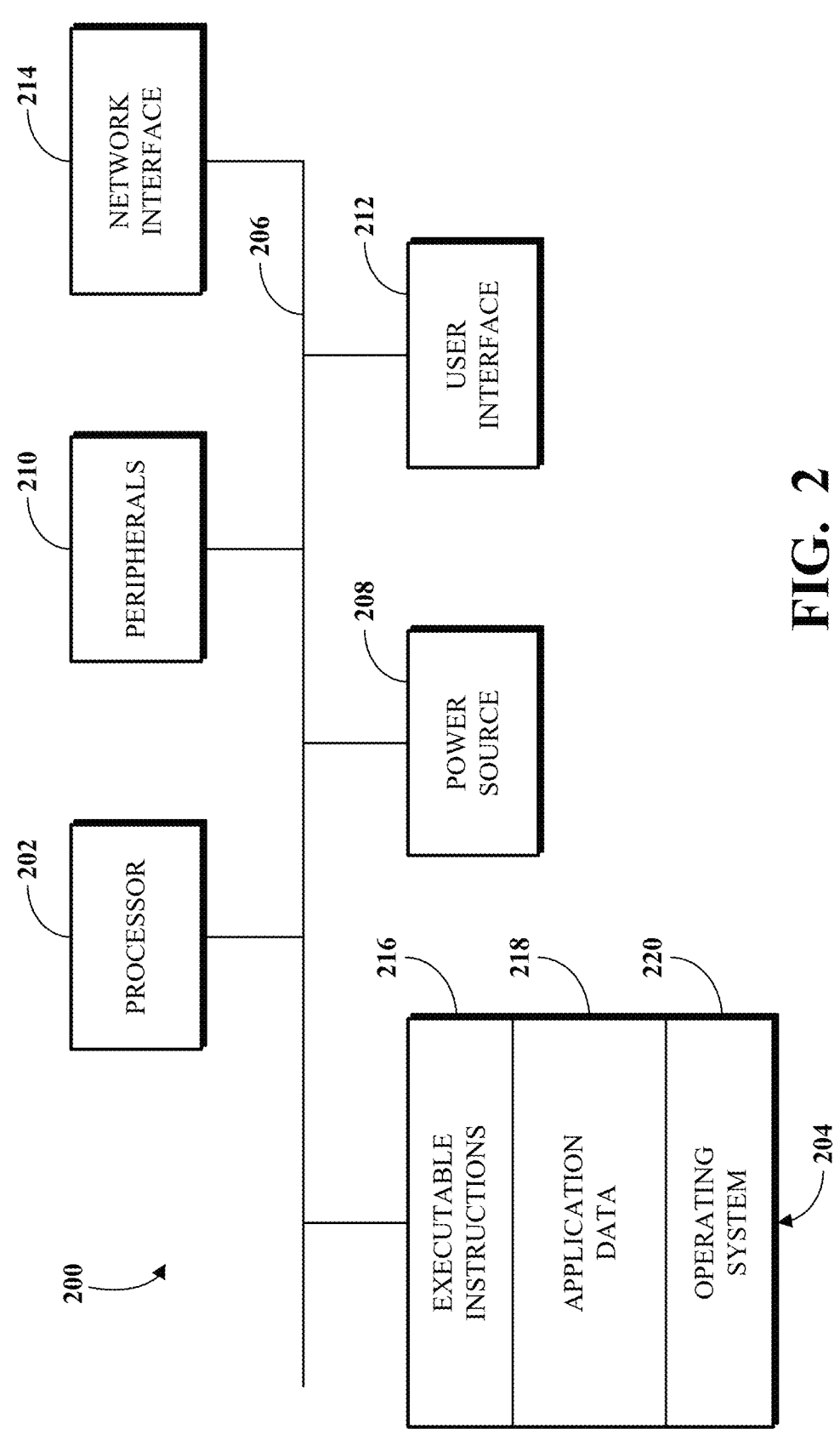
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
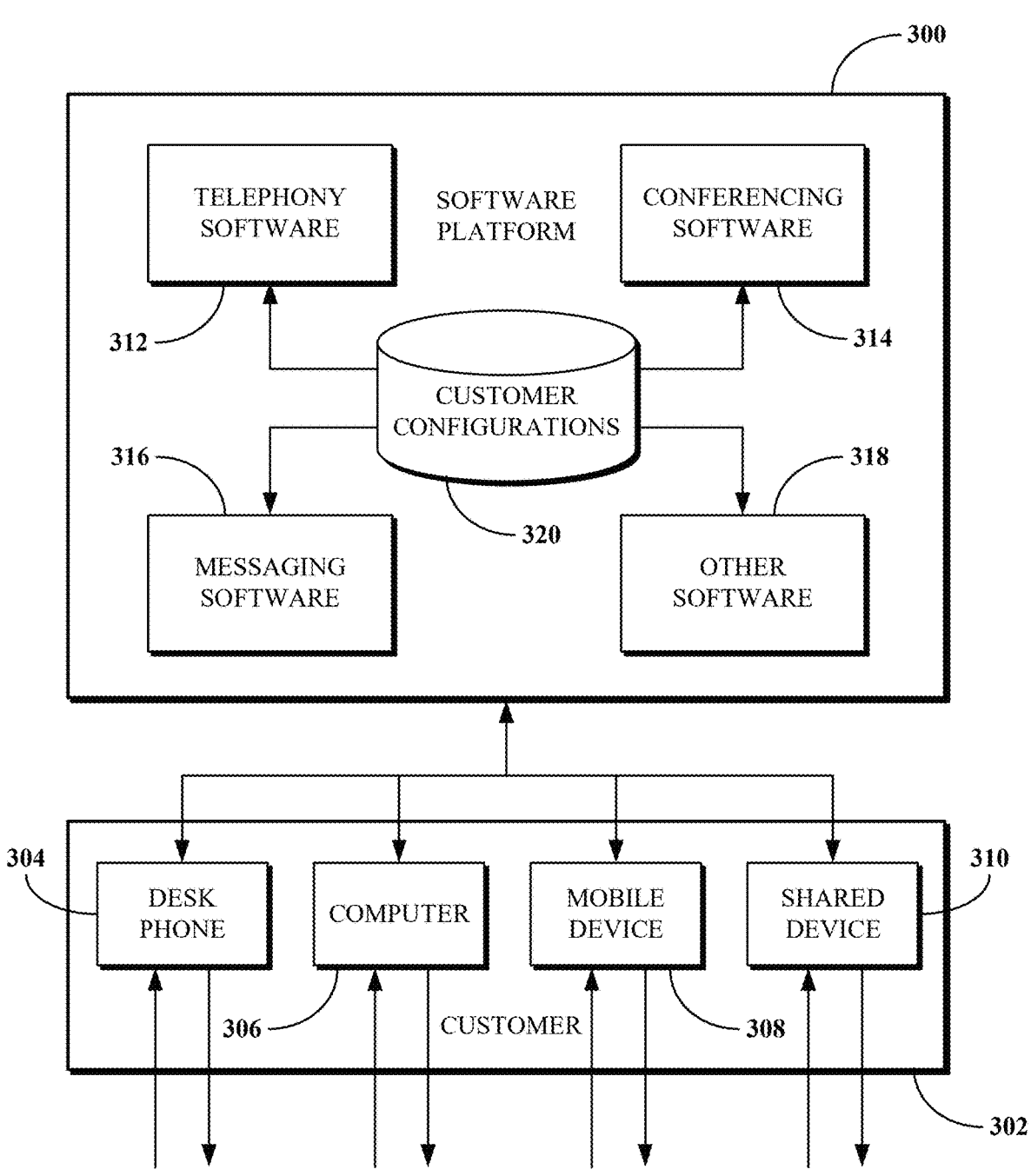
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone 304 is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a virtual open-door software that may work in conjunction with at least one of the messaging software 316 or the conferencing software 314 to provide instant one-on-one video sessions, as described herein. In some such cases, the messaging software 316 may include some or all of the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
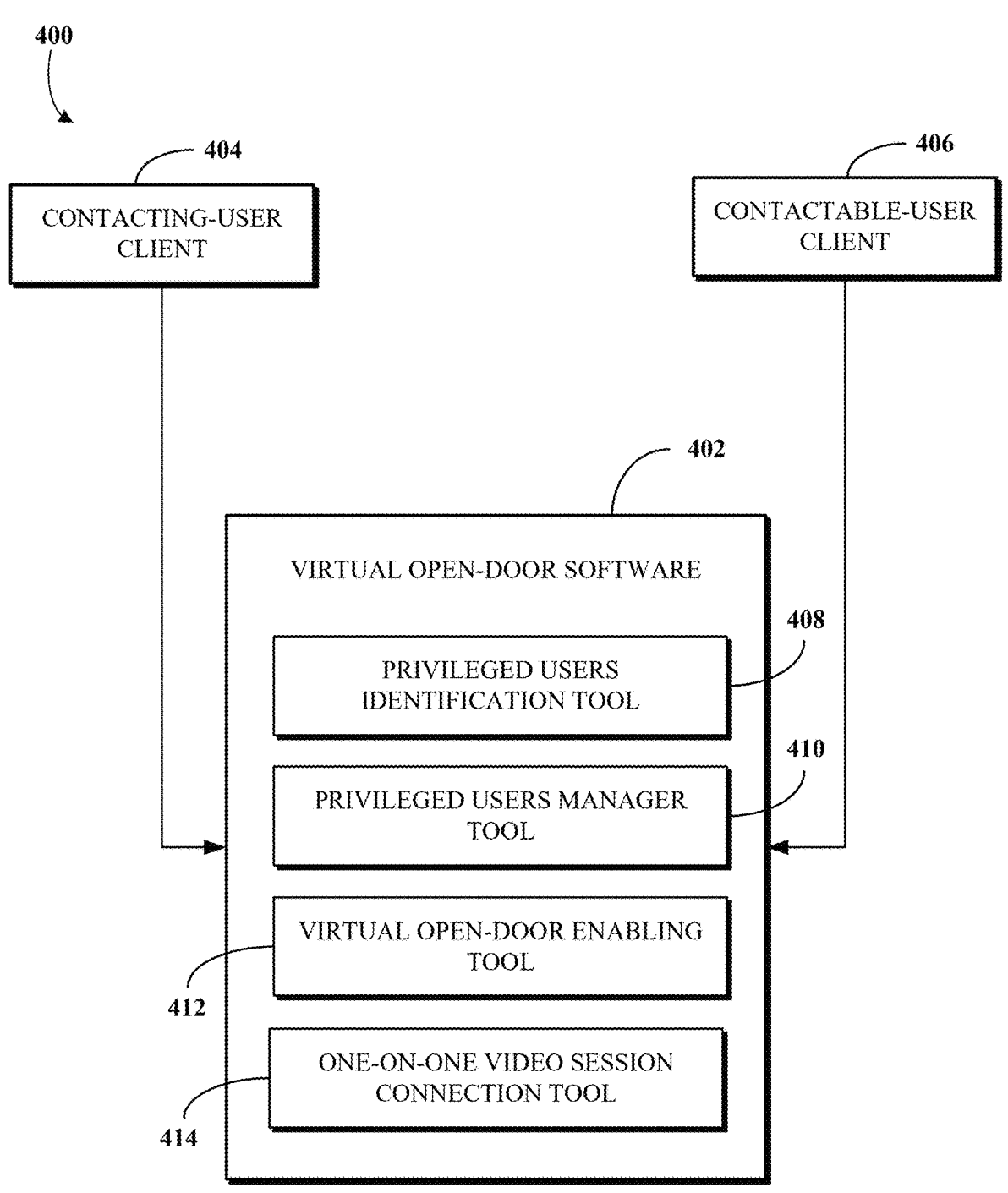
FIG. 4 is a block diagram of an example of a system for instant one-on-one video sessions in an electronic computing and communications system.

FIG. 4 is a block diagram of an example of a system 400 for instant (i.e., direct) one-on-one video sessions in an electronic computing and communications system, for example, the system 100 shown in FIG. 1.

The system 400 includes a virtual open-door software 402, which can be or can be part of the messaging software 316 of FIG. 3. The virtual open-door software 402 can be or can be part of the other software 318 of FIG. 3 that provides one-on-one video sessions in conjunction with the messaging software 316. The virtual open-door software 402 may use functionality of the conferencing software 314 to establish communication sessions, enabling the transmission of video, audio, and audio-visual media streams between clients. The virtual open-door software 402 can be or can enable software for implementing messaging (e.g., text-based messaging) between users of clients, such as a contacting-user client 404 and a contactable-user client 406. The contacting-user client 404 or the contactable-user client 406 may each be one of the clients 304 through 310 shown in FIG. 3 that runs a client application associated with the virtual open-door software 402. The system 400 may in at least some cases be implemented using one or more servers of the system 100, for example, the application server 108 shown in FIG. 1. Although two clients are shown in FIG. 4, other numbers of clients and/or other numbers of phones can connect to the system 400.

In FIG. 4, while not explicitly depicted, it should be recognized that within various implementations, the contacting-user client 404 and the contactable-user client 406 may incorporate client-side virtual open-door software. This implies that the virtual open-door software 402 may be segregated into two constituent parts: a client-side portion and a server-side portion. These portions serve distinct roles within the virtual open-door software 402, with each contributing specific functions to its operation. For ease of reference, irrespective of whether a function is executed by the server-side or client-side portion of the virtual open-door software, it is attributed to the virtual open-door software 402.

The client-side virtual open-door software can encompass a subset of the virtual open-door software 402 or, alternatively, it can function collaboratively alongside the virtual server-side open-door software to facilitate seamless interaction and cooperation between itself and the server-side virtual open-door software to enable one-on-one video sessions, as described herein. For instance, when a particular function or task cannot be executed by one side (either the client portion or the server portion), that side can call upon the complementary capabilities of the other side (either the server portion or the client portion, as the case may be) to fulfill that function or task. Additionally, some functions may be redundantly implemented by the serve-side portion and by the client-side portion. To provide a practical example, consider the blurring of a video stream originating from a client. This blurring operation can be performed by either the client-side or the server-side portions. As another example, to enable a camera of a client, the client-side portion can activate the camera in response to a command, such as a request, issued by the server-side portion.

Via the virtual open-door software 402, a user (i.e., a contactable user) of the contactable-user client 406 may enable (e.g., configure or grant privileges to) another user (i.e., a contacting user) of the contacting-user client 404 to initiate instant one-on-one video sessions with the contactable user when the contactable user has indicated their availability for engaging in one-on-one video sessions.

The virtual open-door software 402 includes tools, such as programs, subprograms, functions, routines, subroutines, operations, executable instructions, and/or the like for, inter alia and as further described below, enabling users to engage in instant one-on-one video sessions. At least some of the tools of the virtual open-door software 402 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the virtual open-door software 402 includes a privileged users identification tool 408, a privileged users manager tool 410, a virtual open-door enabling tool 412, and a one-on-one video session connection tool 414. In some implementations, the virtual open-door software 402 can include more or fewer tools. In some implementations, some of the tools may be combined, some of the tools may be split into more tools, or a combination thereof.

The privileged users identification tool 408 can identify, for a contactable user, other users who should be granted the privilege to establishing instant one-on-one video sessions with the contactable user. That is, the privileged users identification tool 408 may configure other identified users as privileged users (i.e., contacting users) for the contactable user. To reiterate, a contacting user with respect to a contactable user is one that can (e.g., is configured to) initiate one-on-one video sessions with the contactable user. A contacting user, with respect to a contactable user, is one who has the capability, or is configured to have the capability, to initiate one-on-one video sessions with the contactable user.

The privileged users identification tool 408 may identify users that can be designated as contacting users based on shared characteristics or connections with the contactable user. For example, the privileged users identification tool 408 may identify users based on organizational relationships, such as working within the same department as the contactable user, reporting to the same manager as the contactable user, reporting to the contactable user, collaborating on common projects with the contactable user, common attendance in one or more past meetings, or other attributes associated with the contactable user. The shared characteristics can pertain to the past, present, or anticipated future characteristics.

In certain scenarios, users may voluntarily disclose attributes such as interests, hobbies, or geographic locations. The privileged users identification tool 408 can utilize this information for user identification purposes. Additionally, users may choose to opt into a tracking system facilitated or implemented by the privileged users identification tool 408. The privileged users identification tool 408 can use such tracking to identify users who interact more frequently (e.g., more than a threshold amount) with the contactable user compared to other users. The privileged users identification tool 408 then leverages this data to designate such users as contacting users. For example, the privileged users identification tool 408 may access records of past communications, which may include email exchanges, chat messages, phone call histories, meetings where the users were joint participants, or other forms of prior interactions between users. By analyzing these historical communication records, the privileged users identification tool 408 can identify users who interact more frequently, surpassing a specified threshold, with the contactable user and configures these users as contacting users.

The privileged users identification tool 408 may access external data sources containing relationship information associated with the contactable user. For instance, such sources may store data on current projects of users or maintain social graphs for users. By accessing this data, the privileged users identification tool 408 can identify users currently involved in the same projects as the contactable user or users connected within the contactable social network of the contactable user. The privileged users identification tool 408 may then configure, as contacting (i.e., privileged) users, those users with established connections to the contactable user. In an example, the connections within the social graph may be categorized with labels, including but not limited to family, acquaintances, professional connections, or similar descriptive tags. In an example, the privileged users identification tool 408 may configure the family connections as contacting users. In an example, the connections in the social graph may have associated therewith connection strengths. The privileged users identification tool 408 may identify, as contacting users, those having connection strengths greater than a threshold.

The privileged users manager tool 410 provides user interfaces (not shown) that a contactable user can use to modify the list of contacting users identified by the privileged users identification tool 408. Via the privileged users manager tool 410, a contactable user can remove some of the identified users or can add contacting users not identified by the privileged users identification tool 408. In an example, the contactable user may indicate that any user can be an contacting user.

The privileged users manager tool 410 may enable a contactable user to group the contacting users into groups. The contactable user may associate an availability schedule with a group. An availability schedule can indicate the times (and/or days) when the contactable user is considered available for accepting instant one-on-one video sessions from members of the group. To illustrate, a contactable user may associate a schedule with group named "mentees" indicating that the contactable user is available to mentor those in the group every Monday, Wednesday, and Friday from 9:00 AM to 12:00 PM. As mentioned above, the contactable user may indicate that any user can be an contacting user. Such users may be added to an implicit group and the contactable user can associate an availability schedule therewith.

When an availability schedule is not associated with a contacting user or with a group in which the contacting user is included, the contactable user is considered available for one-on-one video sessions with the contacting user whenever the contactable user has indicated their availability for engaging in one-on-one video sessions. On the other hand, when an availability schedule is associated with a contacting user, then the contactable user is not considered available, despite indicating their availability, if the contacting user desires to initiates a one-on-one video session with the contactable user outside of the availability schedule associated therewith. Stated another way, an availability schedule takes precedence over the general availability setting of the contactable user. Stated yet another way, the contactable user is not available for one-on-one video sessions with the contacting user, even if the contactable user has indicated their general availability, unless the request falls within the scheduled times specified in the availability schedule.

The virtual open-door enabling tool 412 may enable (e.g., activate) a camera and mutes au audio input/output devices (e.g., a speaker and a microphone) of the of the contactable-user client 406 in response to the contactable user indicating their availability to engage in one-on-one video sessions. The video stream captured by the camera may be displayed at a display of the contactable-user client 406 so that the contactable user can see what others might see when they exhibit an intent to communicate with the contactable user. In response to identifying an intent of the contacting user associated with the contacting-user client 404 to communicate, such as through a chat application, with the contactable user, the video stream may be transmitted to the contacting-user client 404 for display. If the contactable user is already engaged in a one-on-one video session with another contacting user, then a modified video stream may be transmitted to the contacting-user client 404. Modifying the video stream may include applying a blur effect to the video or substituting images of the contactable user with an alternative representation. Modifying the video stream may be performed at the contactable-user client 406 or at a server that implements the virtual open-door software 402.

The one-on-one video session connection tool 414 establishes an audio-visual communication session between the contacting-user client 404 and the contactable-user client 406. That is, an audio channel and a video channel are established by the one-on-one video session connection tool 414.

FIGS. 5A-5G illustrate examples of user interfaces usable for instant one-on-one video sessions between contactable users and contacting users. The user interfaces of FIGS. 5A-5G can be displayed or caused to be displayed at clients, at least in part, by a virtual open-door software, such as the virtual open-door software 402 of FIG. 4 and at least in part by a messaging software, such as the messaging software 316 of FIG. 3. The user interfaces illustrated in FIGS. 5A-5G serve primarily as illustrative examples to elucidate the concepts outlined herein. As such, the scope of this disclosure is not limited to or by the specific user interface controls or layouts detailed within these examples. The teachings presented herein encompass a wide spectrum of alternative user interfaces, arrangements of user interface controls, and user flows, all of which remain consistent with the principles discussed. For conciseness, certain user interface elements or functionalities that might typically be expected within these interfaces have been omitted.

Figure 5A:
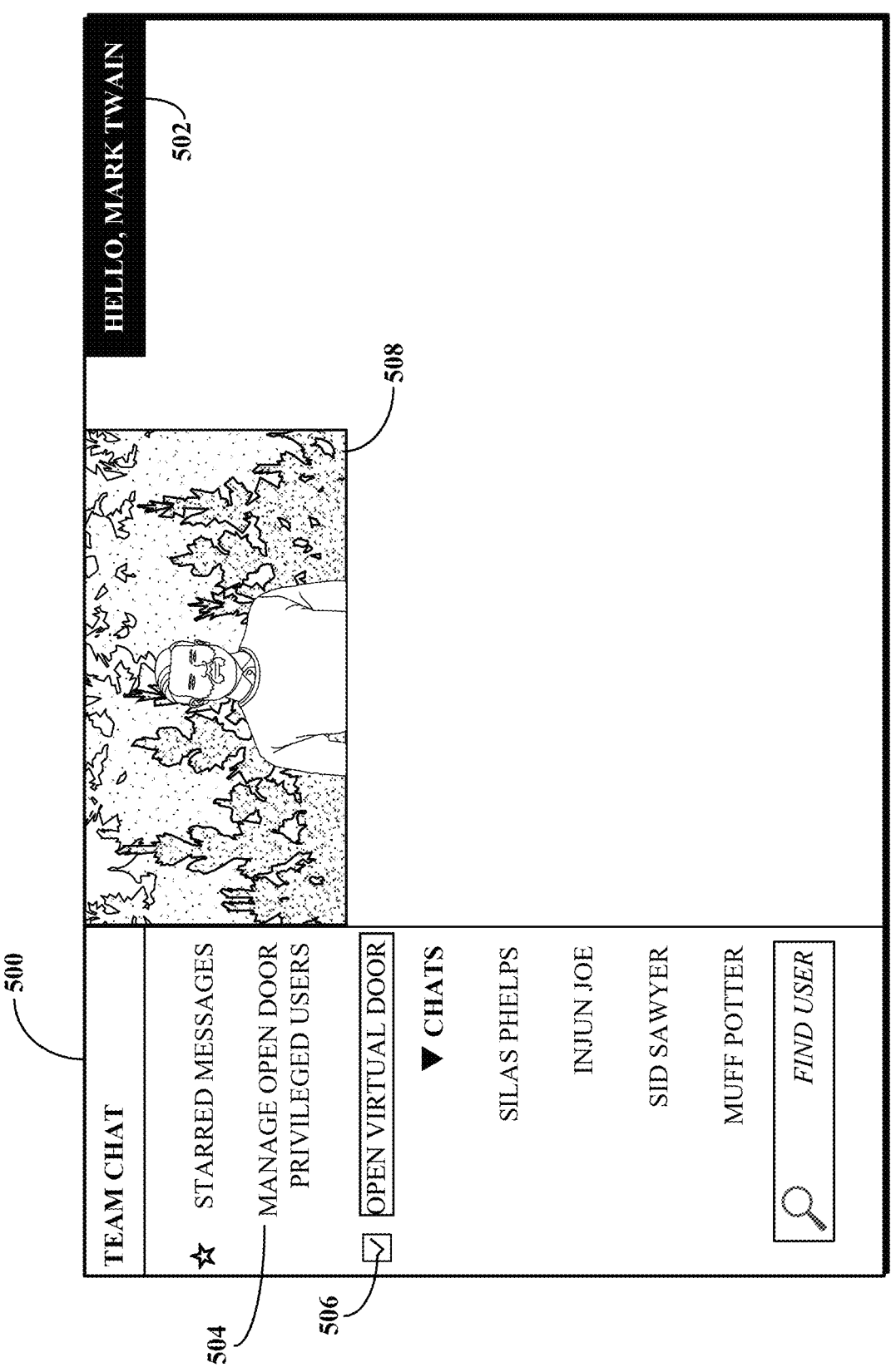
FIG. 5A illustrates an example of a user interface for indicating availability in engaging in one-on-one video sessions.

FIG. 5A illustrates an example of a user interface 500 for indicating availability in engaging in one-on-one video sessions. The user interface 500 illustrates a chat client application usable by a contactable user, such as a user of the contactable-user client 406 of FIG. 4. In this illustration, the name of the contactable user is "Mark Twain," as indicated by a greeting 502. By invoking an action 504, additional user interfaces (not shown) may be displayed enabling the contactable user to manage (e.g., modify) their list of contacting users, as described with respect to the privileged users manager tool 410.

A checkbox 506, when enabled (i.e., checked) by the contactable user, indicates that the contactable user is available for engaging in one-on-one video sessions. In response to the contactable user enabling the checkbox 506, the virtual open-door software enables a camera of the client of the contactable user and a video stream obtained therefrom can be displayed in a preview tile 508. While not specifically shown, the user interface 500 may enable the contactable user to configure a virtual background (which may be any type of media, such as an image or a video) for their video stream. In response to configuring the virtual background, images obtained from the camera may be segmented into respective foreground segments and background segments where the foreground segments include visual representations of the contactable user. In the video stream displayed in the preview tile 508, the background segments would be replaced by the virtual background. That is, the foreground segments would be overlaid over the virtual background.

Figure 5B:
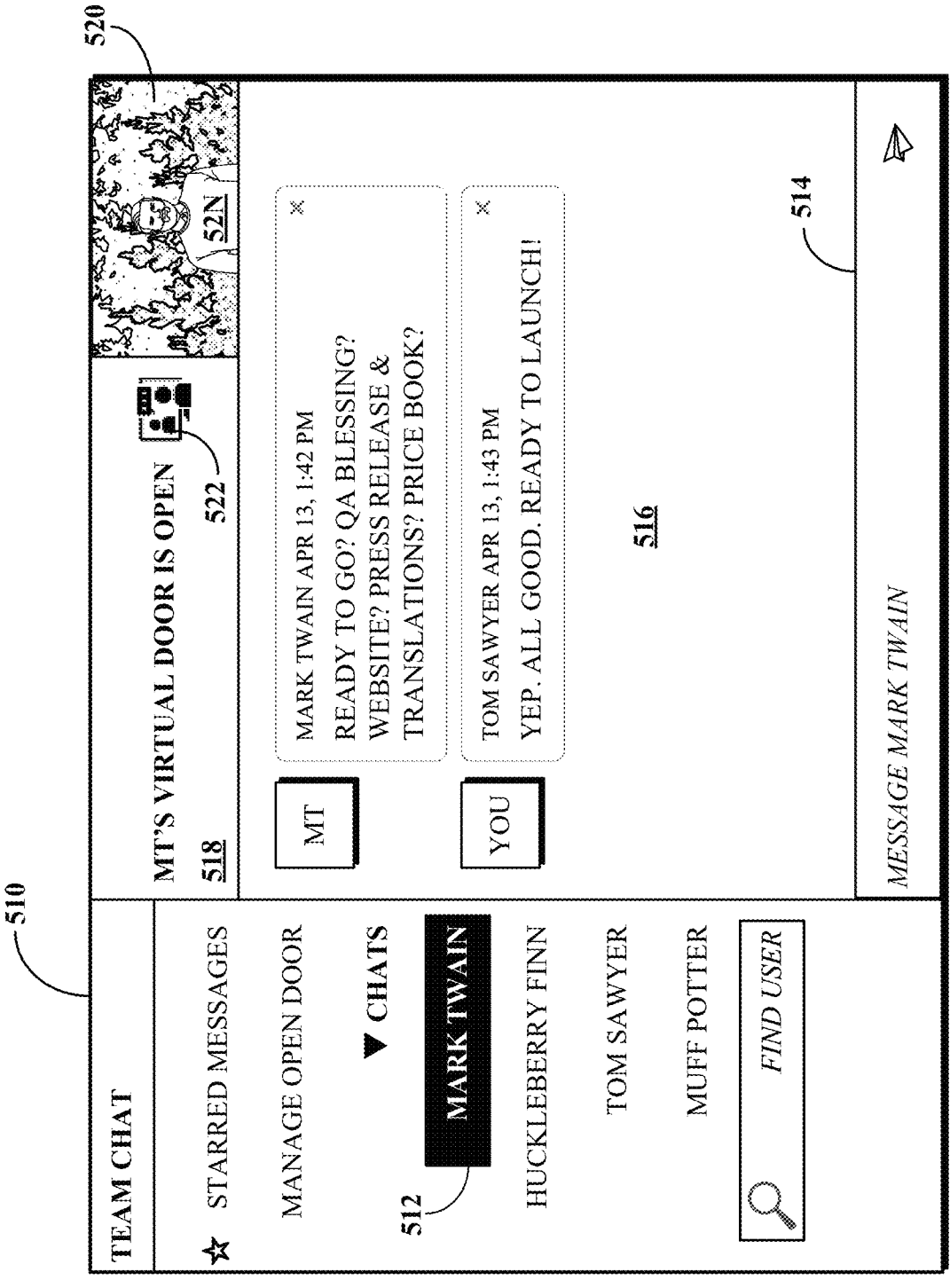
FIG. 5B is an example of a user interface illustrating an intent of a contacting user to chat with a contactable user who is not engaged in a one-on-one video session.

FIG. 5B is an example of a user interface 510 illustrating an intent of a contacting user to chat with a contactable user who is not engaged in a one-on-one video session. The user interface 510 can be displayed at a client of a contacting user, such as the contacting-user client 404 of FIG. 4. The user interface 510 illustrates that the privileged user has selected, as indicated by a highlight 512, the name of the contactable user of FIG. 5A. The virtual open-door software can interpret the selection of the privileged user as an intent to chat with the contactable user. However, other ways of inferring an intent to communicate (e.g., chat) with the contactable user are possible. In a field 514, the contacting user can type a text (e.g., chat) message to the contactable user. A panel 516 shows previous and current messages exchanged between the contacting user and the contactable user.

Since, as described with respect to FIG. 5A, the contactable user has indicated their availability for one-on-one video sessions, a panel 518 is displayed in the user interface 510. In an example, if the contactable user has not indicated their availability for one-on-one video sessions, then the panel 518 may essentially state that the contactable user is "NOT AVAILABLE FOR VIDEO SESSIONS." The panel 518 includes a preview tile 520 corresponding to the preview tile 508 of FIG. 5A.

In an example, a video communication session may be immediately established in response to detecting speech from the privileged user. That is, as soon as the privileged user starts speaking, the virtual open-door software establishes the one-on-one video session. While the session is being setup, the virtual open-door software may buffer any audio detected from the privileged user and transmits the buffered audio to the client of the contactable user when or as the session is established. In another example, the one-on-one video communication session is established in response to the privileged user activating a command 522. In response to the command 522, the virtual open-door software causes the video session to be established.

To establish the one-on-one video session, the virtual open-door software may activate the camera on the client of the contacting user, enables audio input devices (such as microphones) and audio output devices (such as speakers) on both clients, and formally establishes the video communication session, which includes the creation of audio and video channels between the clients. In an example, the video communication session may utilize WebRTC technology to facilitate real-time audio and video transmission.

Figure 5C:
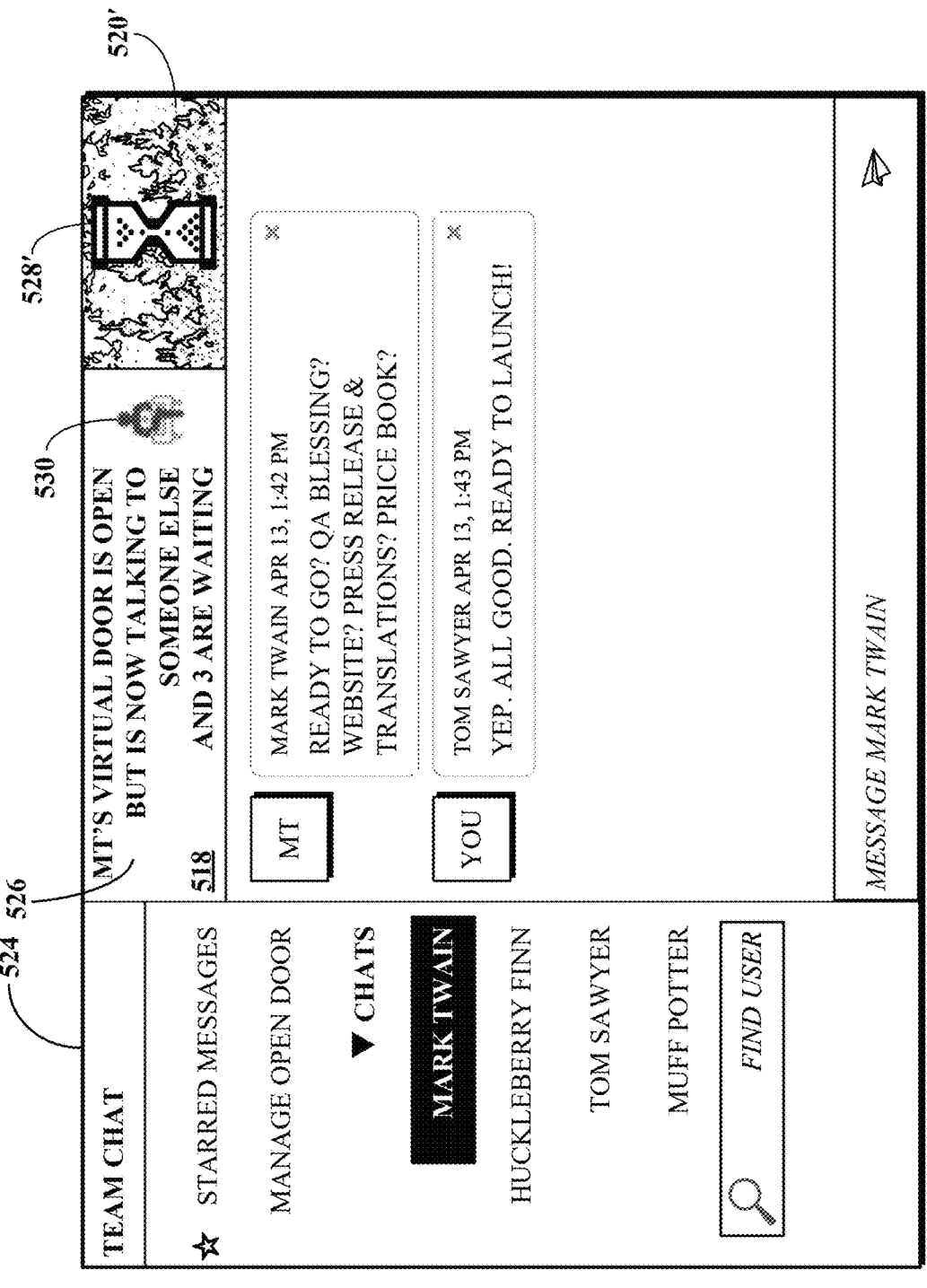
FIG. 5C is an example of a user interface illustrating an intent of a contacting user to chat with a contactable user who is already engaged in a one-on-one video session.

FIG. 5C is an example of a user interface 524 illustrating an intent of a contacting user to chat with a contactable user who is already engaged in a one-on-one video session. The user interface 524 is similar to the user interface 510 of FIG. 5B except for the content of the panel 518. A message 526 indicates to the contacting user that, while the contactable user is available for one-on-one video sessions, the contactable user is currently engaged in a one-on-one video session with at least one other contacting user. The message 526 may indicate a number of other contacting users waiting to engage in one-on-one video sessions with the contactable user.

A preview tile 520' may show a different preview than that shown in FIG. 5B to preserve the privacy of the contactable user and that of the other contacting user while they are engaged in the one-on-one video session. In an example, the preview tile 520' may show a blurred version of the video stream that would be displayed in the preview tile 520. In an example, the preview tile 520' may show a static image. In an example, the representation of the contactable user may be replaced by another representation or object in the preview tile 520'. To illustrate, and without limitations, whereas the preview tile 520 shows a representation 528 of contactable user, the representation 528 has been replaced by a representation 528' (in this case, an hour glass) in the preview tile 520'. The contacting user can decide to wait (e.g., to be queued) for the contactable user by invoking a wait command 530. In response to the wait command 530, the privileged user is added to the queue (e.g., list) of other engaging users waiting to engage in one-on-one video sessions with the contactable user.

Figure 5D:
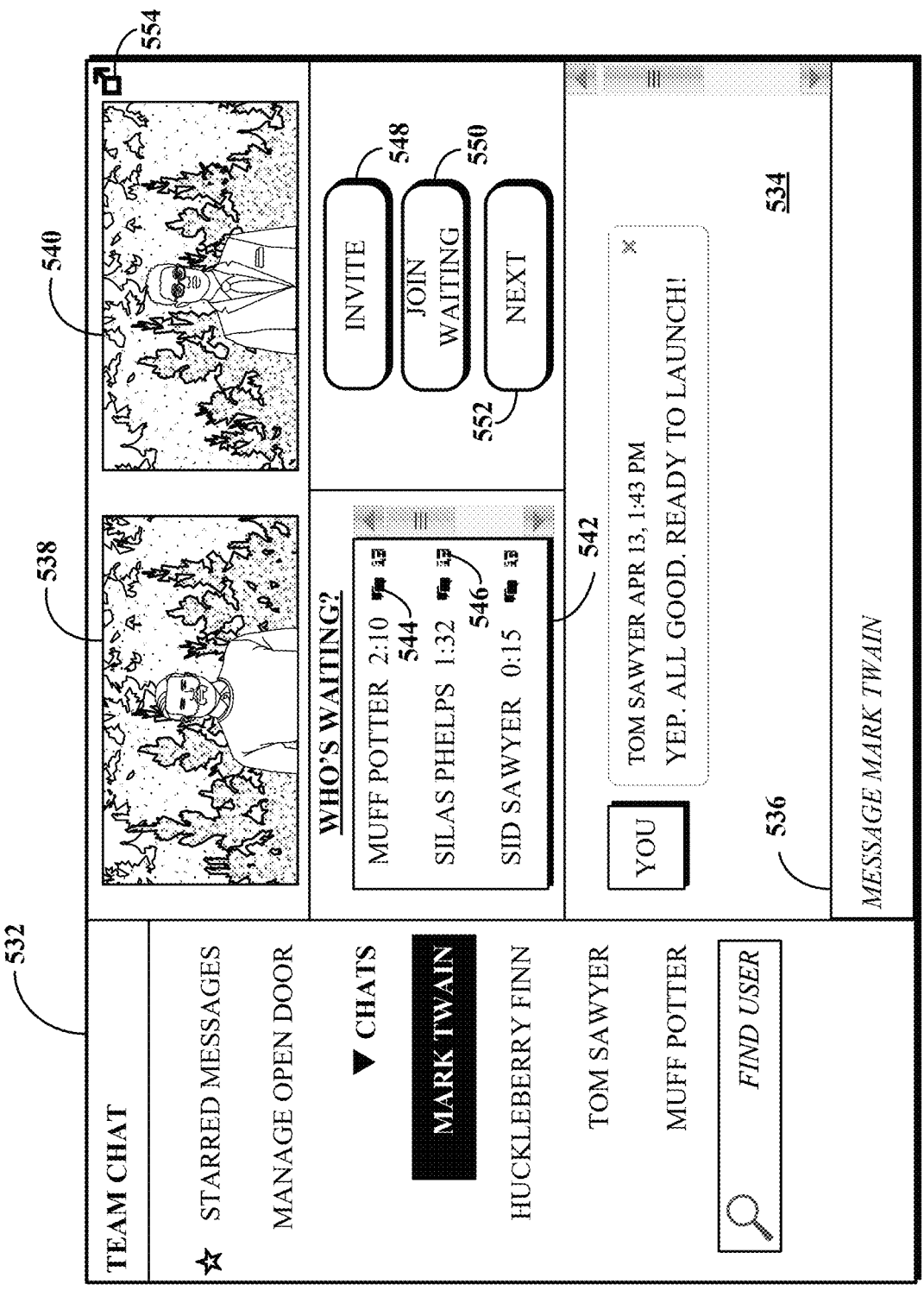
FIG. 5D illustrates an example of a user interface usable by a contactable user when engaged in a one-on-one video session.

FIG. 5D illustrates an example of a user interface 532 usable by a contactable user when engaged in a one-on-one video session. The user interface 532 may be displayed by the virtual open-door software when a video session is established between clients of the contactable user and the contacting user described with respect to FIG. 5B. The user interface 532 may include a panel 534, which can be as described with respect to the panel 516 of FIG. 5B. A field 536 can be as described with respect to the field 514 of FIG. 5B.

Each of the users of the one-on-one video session can be represented by a tile, such as tiles 538 and 540 for displaying video streams associated with the grant and the privileged user, respectively. A tile as used herein generally refers to a portion of a virtual open-door software user interface which displays information (e.g., a rendered video) associated with a user of the one-on-one video session. A tile may, but need not, be generally rectangular. The size of a tile may depend on one or more factors including the view style set for the virtual open-door software user interface at a given time and whether the user represented by the tile is an active speaker at a given time.

The virtual open-door software can cause to be displayed a list 542 of other waiting contacting users, if any. The list 542 can include, for each waiting user, the length of time that the user has been waiting. Respective commands, such as commands 544 and 546 may be associated with the waiting contacting users. By invoking the command 544, the contactable user can send a text message to the corresponding privileged user. To illustrate, the contactable user may send a message to "Muff Potter" essentially stating "wrapping up . . . I'll be with you shortly." By invoking the command 546, the contactable user can cause the corresponding privileged user to be added to one-on-one video session that the contactable user is currently engaged in.

By invoking a command 548, the virtual open-door software enables the contactable user to search for and send invitations to one or more other users (privileged or not) to join the one-on-one video session. An invitation can include connection information usable by an invitee to join the one-on-one video session. By invoking a command 550, the virtual open-door software enables the contactable user to select one or more of the waiting contacting users causing their respective clients to be added (e.g., joined) to the one-on-one video session. A client of a waiting contacting user is added to the video session as described above with respect to establishing a video session between the contactable user and a privileged user. By invoking a command 552, the virtual open-door software terminates a current video session and establishes a one-on-one video session with the next waiting contacting user. By invoking a command 554, the virtual open-door software causes an expanded view corresponding to the one-on-one video session to be displayed at the client of the contactable user.

Figure 5E:
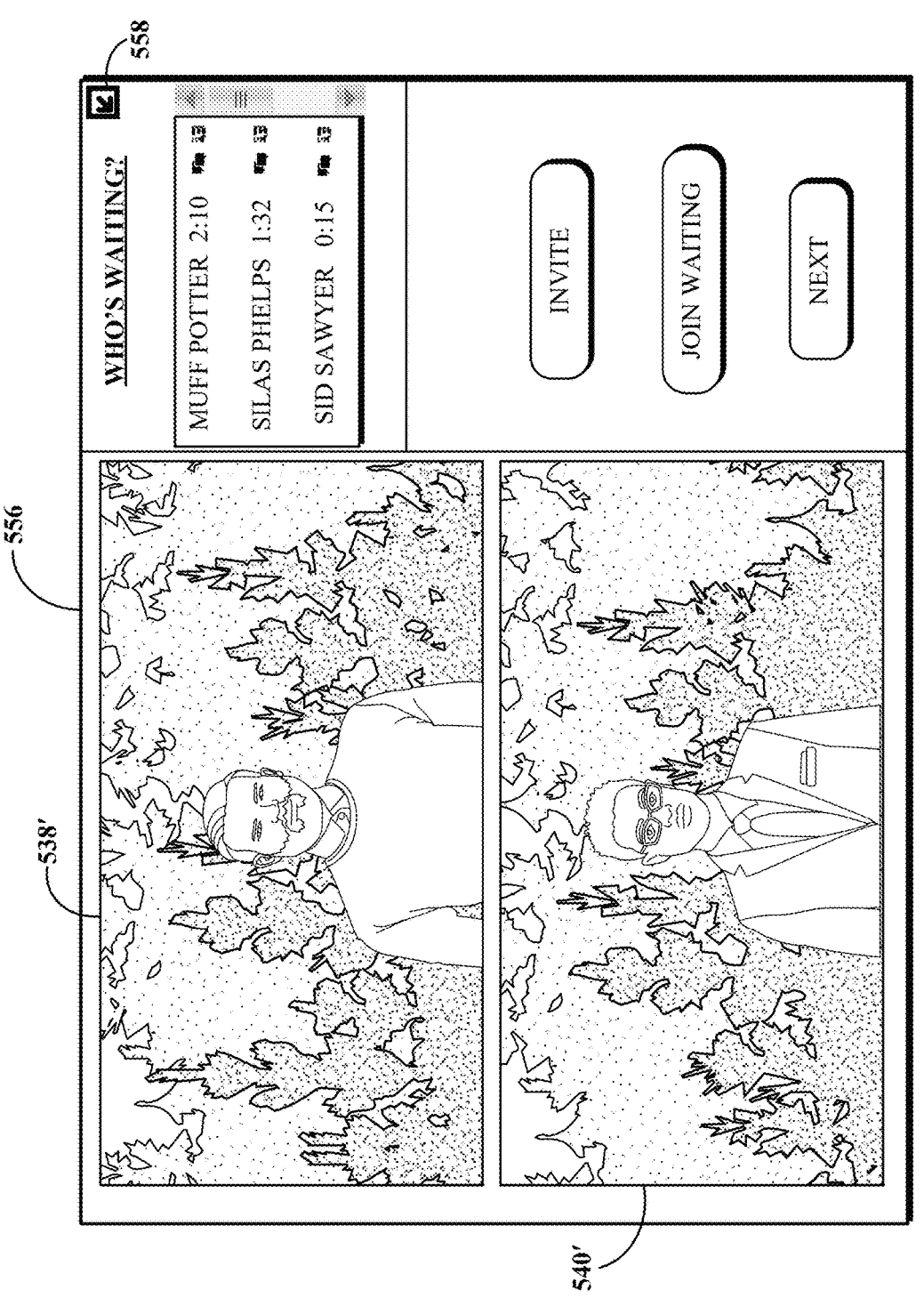
FIG. 5E is an example of a user interface illustrating an expanded view of a one-on-one video session.

FIG. 5E is an example of a user interface 556 illustrating an expanded view of a one-on-one video session. The user interface 556 can be displayed in response to an invocation of the command 554 of FIG. 5D. The user interface 556 essentially includes many of the same elements described with respect to FIG. 5D, albeit differently arranged. Notably, the tiles 538 and 540 of FIG. 5D are enlarged and rearranged, as illustrated by tiles 538' and 540', respectively. Additionally, the user interface 556 includes a command 558 that, when invoked, causes the view of the one-on-one video session to be returned to the state described with respect to FIG. 5D.

Figure 5F:
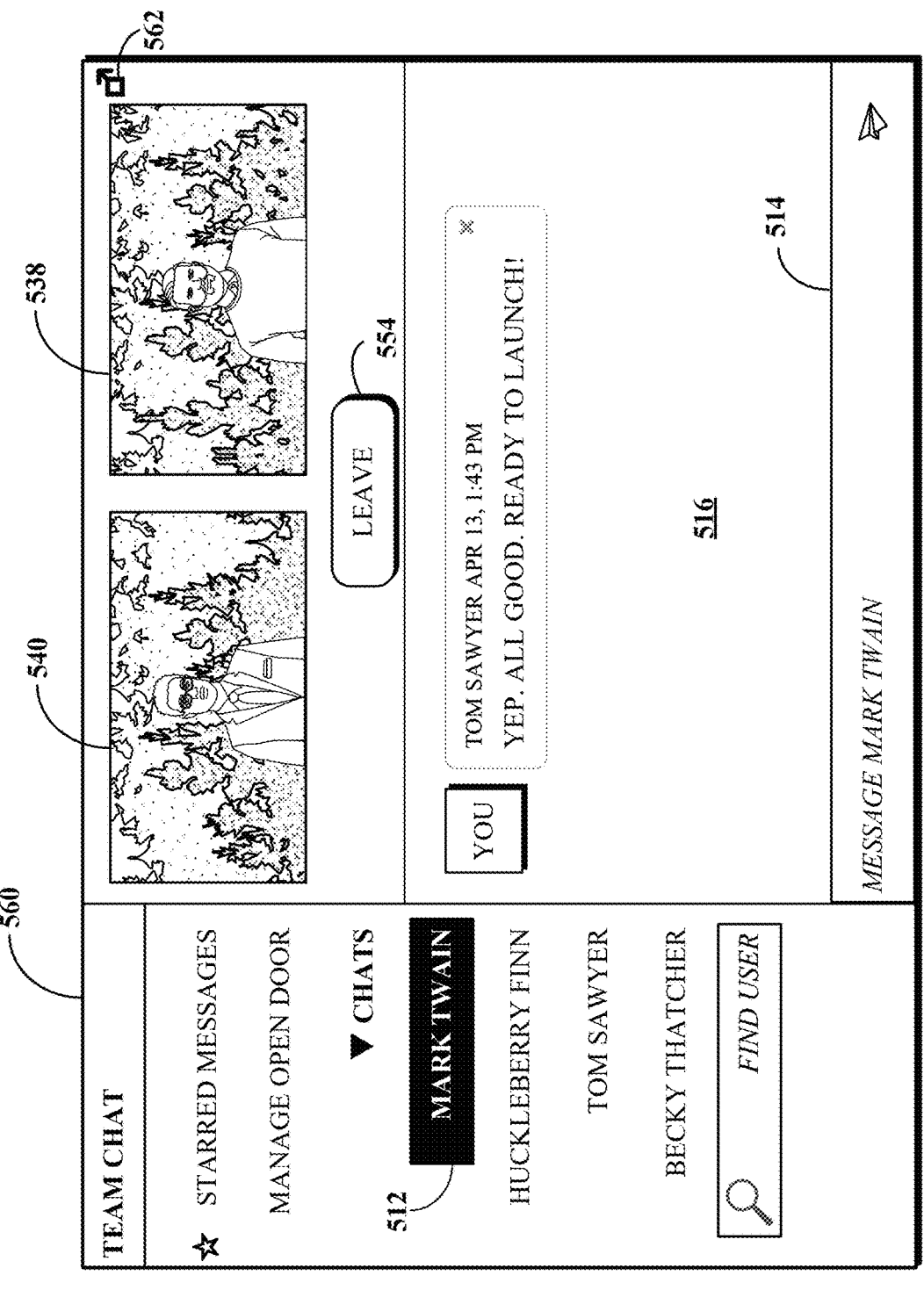
FIG. 5F illustrates an example of a user interface that is displayed at a client of a contacting user.

FIG. 5F illustrates an example of a user interface 560 that is displayed at a client of a contacting user. The user interface 560 may be displayed by the virtual open-door software when a video session is established between respective clients of the contactable user and the privileged user. The user interface 560 includes elements described with respect to FIG. 5B and the descriptions therefor are omitted. In the user interface 560, each of the users of the one-on-one video session can be represented by a tile. As such, the user interface 560 includes the tiles 538 and 540 of FIG. 5D for displaying video streams associated with the contactable user and the contacting user, respectively.

In response to the contacting user invoking a command 554, the virtual open-door software causes the one-on-one video session to be terminated. In response to the contacting user invoking a command 562, the virtual open-door software causes the expanded view illustrated in FIG. 5G to be displayed at the client of the contacting user.

Figure 5G:
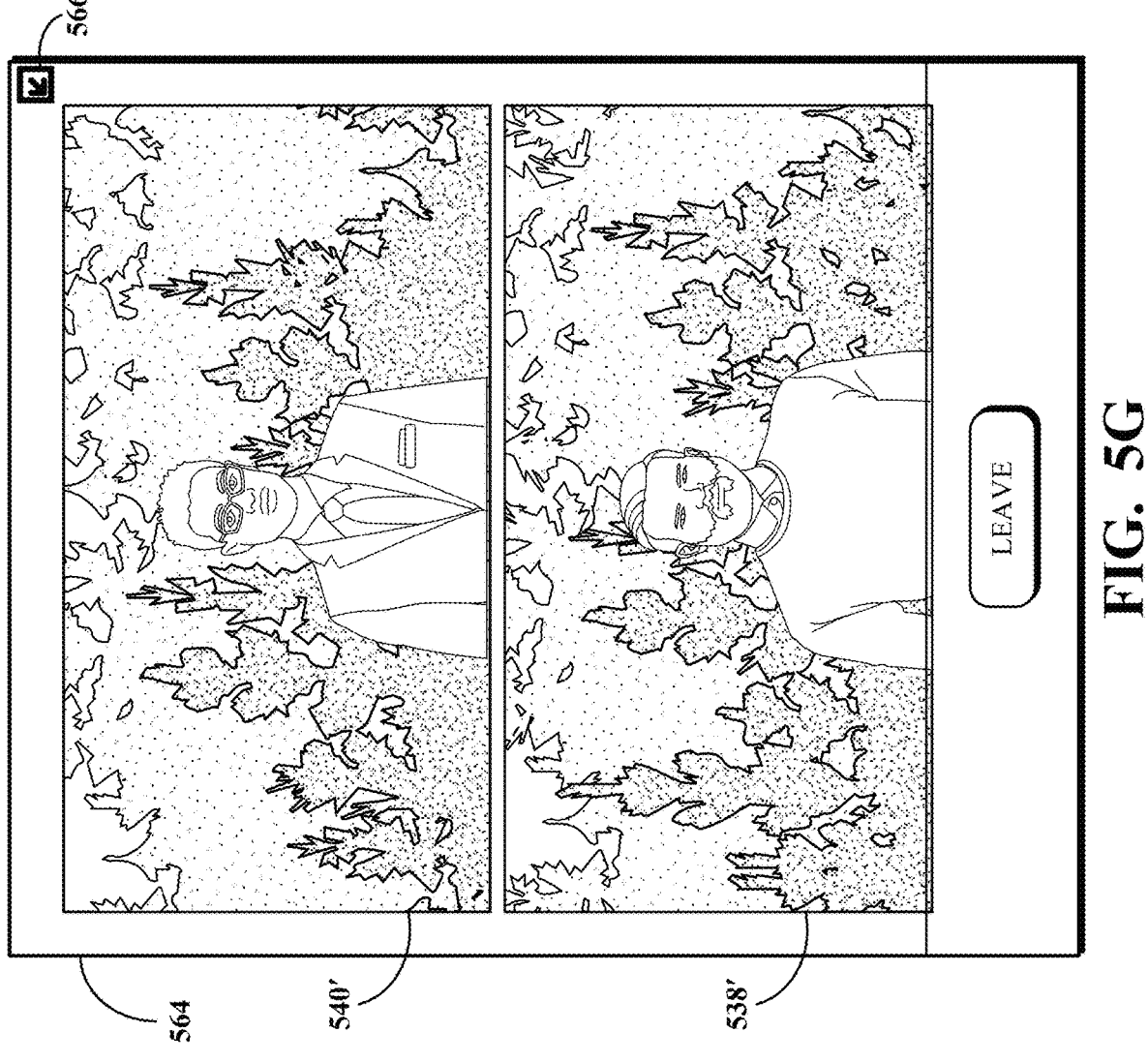
FIG. 5G is an example of a user interface illustrating an expanded view of a one-on-one video session.

FIG. 5G is an example of a user interface 564 illustrating an expanded view of a one-on-one video session. The user interface 564 can be displayed in response to an invocation of the command 562 of FIG. 5F. The user interface 564 essentially includes some of the same elements described with respect to FIG. 5F, albeit differently arranged. Notably, the tiles 538 and 540 of FIG. 5F are enlarged and rearranged, as illustrated by tiles 538' and 540', respectively. Additionally, the user interface 564 includes a command 566 that, when invoked, causes the view of the one-on-one video session to be returned to the state described with respect to FIG. 5F.

Figure 6:
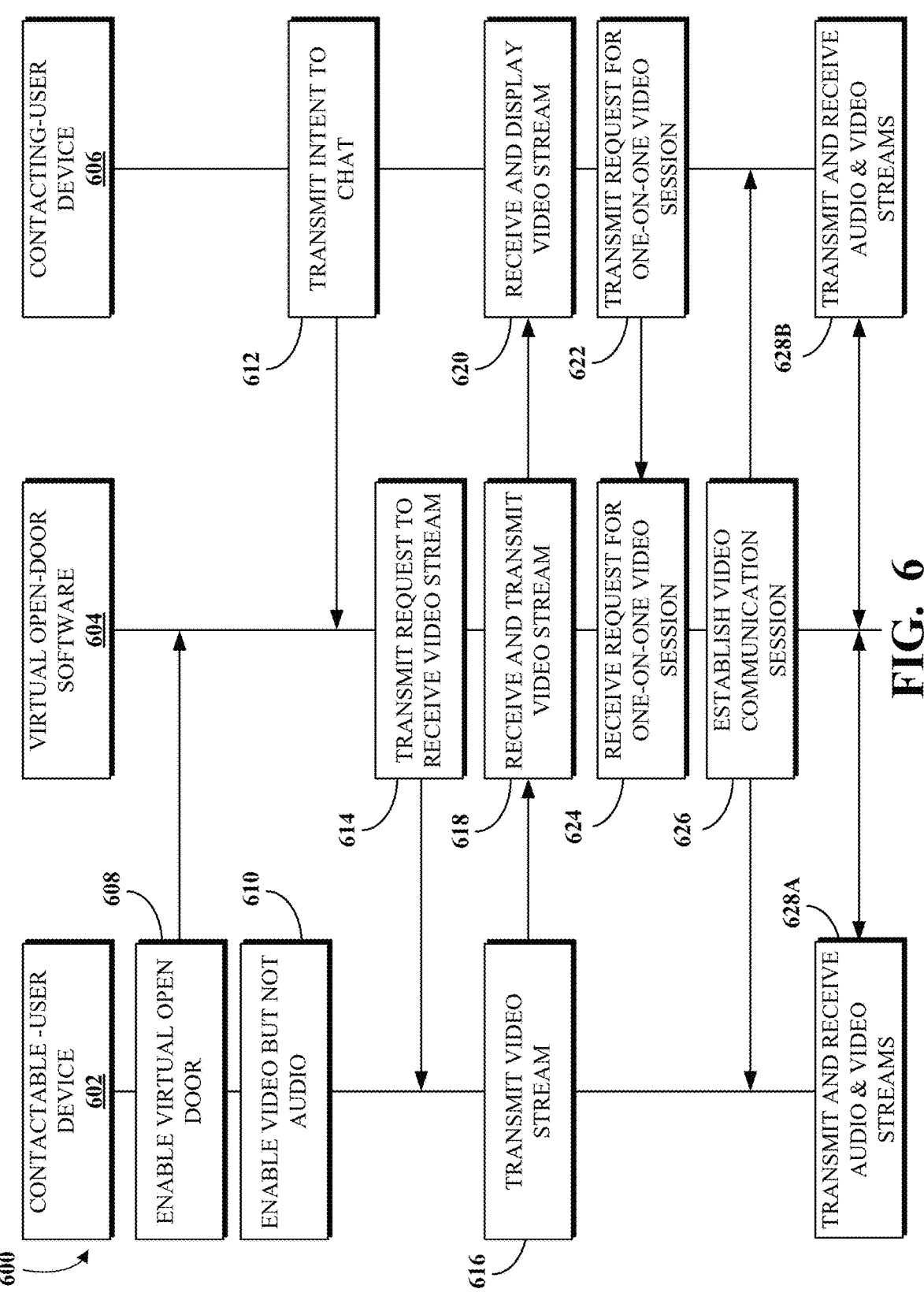
FIG. 6 is an example of an interaction diagram for one-on-one video sessions.

FIG. 6 is an example of an interaction diagram 600 for one-on-one video sessions. The interaction diagram 600 includes a contactable-user device 602 and a contacting-user device 606, which can be, respectively, the contactable-user client 406 and the contacting-user client 404 of FIG. 4, and which are in communication with or implement a respective virtual open-door software, such as the virtual open-door software 604, which can be the virtual open-door software 402 of FIG. 4. That is, the virtual open-door software 604 may be a combination of client-side portion and server-side portions. The client-side portion may be further partially implemented by the contactable-user device 602 and partially implemented by the contacting-user device 606.

At 608, the contactable-user device 602 receives an indication, such as from a user (e.g., a contactable user) of the contactable-user device 602, to enable a virtual open door. For example, and as described with respect to FIG. 5A, the user may indicate their availability for engaging in one-on-one video sessions by checking the checkbox 506. At 610, and in response to the indication to enable a virtual open door, the virtual open-door software 604 may enable or cause to be enabled a camera, but not input/output audio devices, of the contactable-user device 602. As such, video obtained from the camera can be displayed at the contactable-user device 602, such as described with respect to the preview tile 508 of FIG. 5A.

At 612, the contacting-user device 606 may transmit an indication of an intent by the contacting user of the contacting-user device 606 to chat with the contactable user of the contactable-user device 602. The indication is transmitted to the virtual open-door software 604. The intent indicates that the privileged user desires to chat with the contactable user. The intent can be inferred based a selection (e.g., in a client application or dedicated chat application) of the contactable user by the contacting user, such as described with respect to FIG. 5B. At 614, in response to receiving the indication of the intent of the privileged user, the virtual open-door software 604 transmits a request to the contactable-user device 602 to receive a video stream captured at the contactable-user device 602. While not explicitly shown in FIG. 6, in response to receiving the indication of the intent, the virtual open-door software 604 determines whether the contactable user is available for engaging in one-on-one video sessions and whether the contacting user is indeed privileged with respect to contactable user for initiating one-on-one video sessions. If so, then the request to receive the video stream is transmitted; otherwise, the interaction diagram 600 terminates.

At 616, the video stream is transmitted from the contactable-user device 602 to the virtual open-door software 604, which in turns receives the video stream, at 618, and transmits it to the contacting-user device 606. At 620, the contacting-user device 606 receives and video stream and displays the video stream at a display of the contacting-user device 606, as described with respect to one of FIG. 5B or FIG. 5C, depending on whether the contactable user is currently engaged in another one-on-one video session.

At 622, a request for a one-on-video video session is transmitted from the contacting-user device 606 to the virtual open-door software 604. The request may be as described with respect to one of the command 522 of FIG. 5B or the command 530 of FIG. 5C, depending on whether the contactable user is currently engaged in another one-on-one video session. At 624, the virtual open-door software 604 receives the command and either establishes (e.g., causes to be established) the video session between the contactable-user device 602 and the contacting-user device 606 if the contactable user is not currently engaged in another one-on-one video session; or adds the contactable user to a queue if the contactable user is currently engaged in another one-on-one video session.

At 626, if the contactable user is not or is no longer engaged in another one-on-one video session, then the virtual open-door software causes a video communication session to be established between the contactable-user device 602 and the contacting-user device 606, as described herein. At 628A and 628B, the contactable-user device 602 and the contacting-user device 606, respectively, transmit and receive video and audio streams of the video communication session for output at the respective devices. In some implementations, the audio and video streams may be transmitted and received via a server-side virtual open-door software or a server implementing the server-side virtual open-door software. In other implementations, the video communication session may be a peer-to-peer video communication session.

Figure 7:
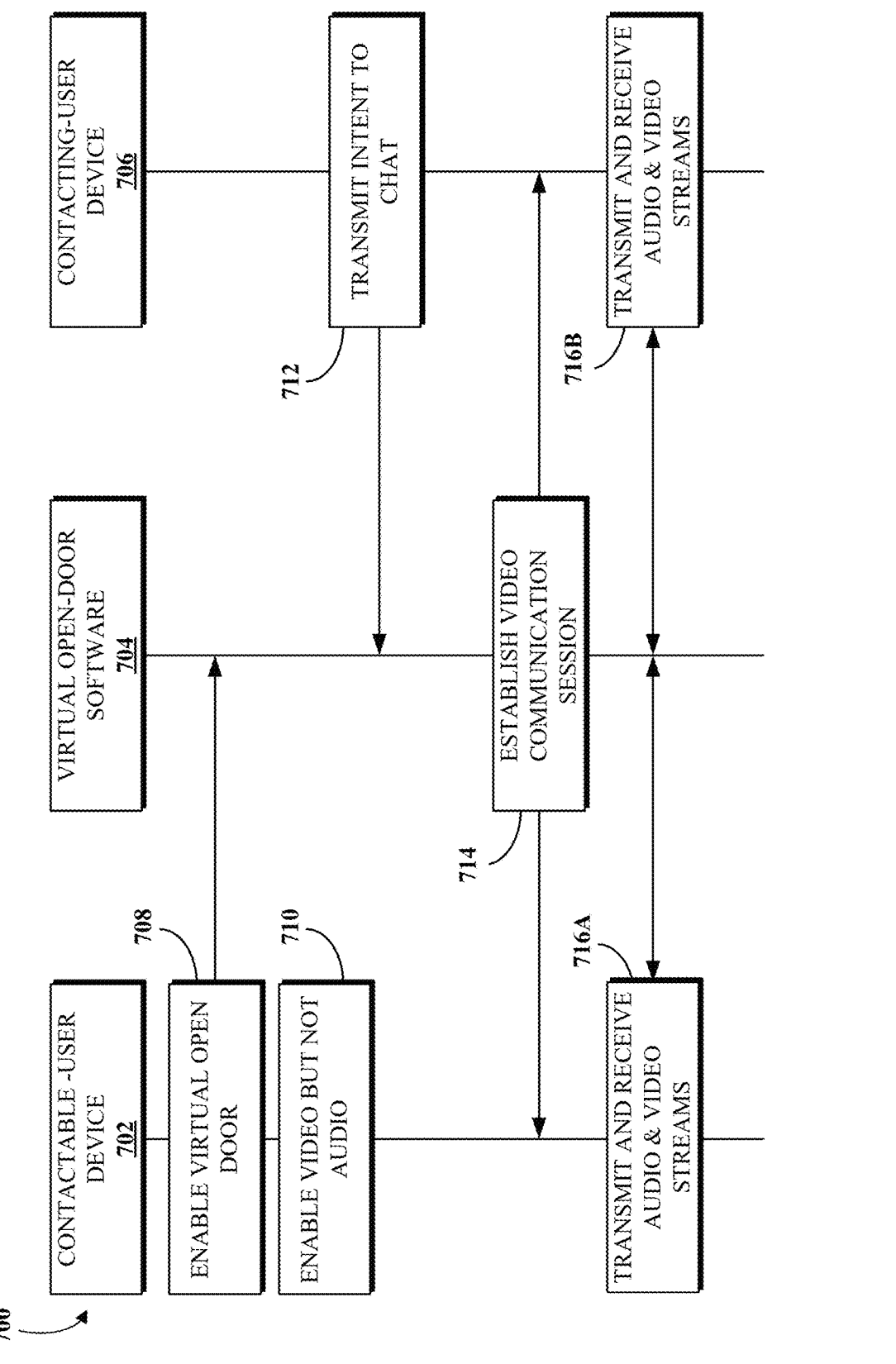
FIG. 7 is an example of another interaction diagram for one-on-one video sessions.

FIG. 7 is an example of an interaction diagram 700 for one-on-one video sessions. The interaction diagram 700 includes a contactable-user device 702, a contacting-user device 706, and a virtual open-door software 704, which can be, respectively, the contactable-user device 602, the contacting-user device 606, and the virtual open-door software 604. The interaction diagram 700 essentially differs from the interaction diagram 600 of FIG. 6 in that whereas the contacting user explicitly transmits a request, at 622, for the one-on-one video session, in the interaction diagram 700 the one-on-one video session is established in response to the contacting user indicating an intent to chat with the contactable user.

The interaction diagram 700 includes steps 708, 710, and 712, can be similar to the steps 608, 610, and 612 of FIG. 6. At 714, in response to receiving the indication of the intent, and in the case that the contactable user is available for one-on-one video session, then the virtual open-door software 704 immediately establishes a video (i.e., and audio-visual) communication session between the contactable-user device 702 and the contacting-user device 706. At 716A and 716B, the contactable-user device 702 and the contacting-user device 706, respectively, transmit and receive video and audio streams of the video communication session for output at the respective devices.

To further describe some implementations in greater detail, reference is next made to examples of techniques which may be performed by or using a system for instant one-on-one video sessions. FIG. 8 is a flowchart of an example of a technique 800 for instant one-on-one video sessions. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

At 802, an input is received from a first device (e.g., the contactable-user client 406 of FIG. 4) indicating that a first user (i.e., a contactable user) is available for one-on-one video sessions. That is, the input indicates that the first user is available for engaging in one-on-one video sessions. In an example, the input can be received as described with at least respect to FIG. 5A.

At 804, an indication of an intent of a second user (i.e., a contacting user) to chat with the first user via a chat application is received from a second device (e.g., the contacting-user client 404 of FIG. 4) of the second user. In an example, the indication of the intent can be received in response to the second user activating a user interface that enables the second user to chat with the first user, such as described at least with respect to FIG. 5B.

At 806, in response to receiving the indication of the intent of the second user, a video stream representative of the first user is transmitted from the first device to the second device. In an example, in response to determining that the first user is not engaged in any one-on-one video sessions (e.g., is not currently engaged in an active one-on-one video session), the video stream is captured using a camera of the first device of the first user, such as described at least with respect to FIG. 5B. In an example, in response to determining that the first user is engaged in the video session, an output stream obtained from the camera of the first device of the first user is blurred to obtain the video stream representative of the first user, such as described at least with respect to FIG. 5C. In an example, in response to determining that the first user is not engaged in any one-on-one video sessions, an audio channel is established between the first device and the second device, as described at least with respect FIGS. 5D and 5F. In an example, the video stream can be transmitted in response to determining that the second user meets one-on-one video session privileges with respect to the first user, as described at least with respect to FIG. 4. In an example, the video stream can be transmitted based on receiving an input from the first user designating the second user as having one-one-one video session privileges with respect to the first user, as described at least with respect to the privileged users manager tool 410 of FIG. 4.

As mentioned above, the second user may be a waiting user. As such, the second user may be selected by the first user from amongst a set of users waiting to engage in one-on-one video sessions with the first user.

FIG. 9 is a flowchart of an example of a technique 900 for instant one-on-one video sessions. The technique 900 can be executed using computing devices, such as the systems, hardware, and software described with respect to FIGS. 1-7. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

At 902, a user interface that enables a first user (i.e., a contacting user) to transmit text-based chat messages to a second user (i.e., a contactable user) is activates. The user interface can be activated in response to a user input received at a first device (e.g., the contacting-user client 404 of FIG. 4) associated with the first user. In an example, activating the user interface can be as described with respect to selecting a name the contactable user in a chat application.

At 904, in response to activating the user interface, a video stream representative of the second user and received from a second device (i.e., a contactable-user client 406) associated the second user is displayed at the first device. In an example, the video stream can be displayed at the first device in response to determining that the first user meets the one-on-one video session privileges with respect to the second user. That is, the first user is configured as a contacting user with respect to the second user.

In an example, an indication that the first user is engaged with another user in a one-on-one video session can be displayed in the user interface, such as described at least with respect to FIG. 5C. In an example, at least one of an audio channel or a video channel is established between the first device and the second device in response to an indication that the second user is available for a one-on-one video session. In an example, the technique 900 can include displaying, in the user interface, an indication of a number of other users waiting to have one-on-one video sessions with the second user, such as described at least with respect to FIG. 5C. In an example, the technique 900 can include adding the first user to a list of waiting users in response to receiving a command from the first user indicating to add the first user to the list of waiting users, such as described at least with respect to FIG. 5C.

For simplicity of explanation, the techniques 800 and 900 of FIGS. 8 and 9, respectively, are each depicted and described herein as a respective series of steps or operations. However, the steps or operations of the techniques 800 and 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The disclosure presented herein may be considered in view of the following clauses.

Example Clause A: A method, comprising: activating, in response to a user input received at a first device associated with a first user, a user interface that enables the first user to transmit text-based chat messages to a second user; and in response to activating the user interface, displaying at the first device a video stream representative of the second user received from a second device associated with the second user.

Example Clause B: The method of Example Clause A, further comprising: displaying, in the user interface, an indication that the first user is engaged with another user in a one-on-one video session.

Example Clause C: The method of Example Clause A or Example Clause B, further comprising: in response to an indication that the second user is available for a one-on-one video session, establishing an audio channel between the first device and the second device.

Example Clause D: The method of any one of Example Clauses A-C, further comprising: in response to an indication that the second user is available for a one-on-one video session, establishing a video channel between the first device and the second device.

Example Clause E: The method of any one of Example Clauses A-D, further comprising: determining that the first user meets one-on-one video session privileges with respect to the second user; and in response to determining that the first user meets the one-on-one video session privileges with respect to the second user, displaying the video stream at the first device.

Example Clause F: The method of any one of Example Clauses A-E, further comprising: displaying, in the user interface, an indication of a number of other users waiting to have one-on-one video sessions with the second user.

Example Clause G: The method of any one of Example Clauses A-F, further comprising: receiving a command from the first user indicating to add the first user to a list of waiting users; and adding the first user to the list of waiting users.

Example Clause H: A system, comprising: one or more memories; and one or more processors, the one or more processors configured to execute instructions stored in the one or more memories to: activate, in response to a user input received at a first device associated with a first user, a user interface that enables the first user to transmit text-based chat messages to a second user; and in response to activating the user interface, display at the first device a video stream representative of the second user received from a second device associated the second user.

Example Clause I: The system of Example Clause H, wherein the one or more processors are further configured to execute instructions stored in the one or more memories to: display, in the user interface, a text message indicating that the first user is engaged with another user in a one-on-one video session.

Example Clause J: The system of Example Clause H or Example Clause I, wherein the video stream representative of the second user comprises a blurred version of a video stream obtained via a camera of the second device.

Example Clause K: The system of any one of Example Clauses H-J, wherein the one or more processors are further configured to execute instructions stored in the one or more memories to: establish a video communication session between the first device and the second device.

Example Clause L: The system of any one of Example Clauses H-K, wherein the video stream is displayed at the first device in response to a determination that the first user meets one-on-one video session privileges with respect to the second user.

Example Clause M: The system of any one of Example Clauses H-L, wherein the user interface includes an indication of a number of other users waiting to have one-on-one video sessions with the second user.

Example Clause N: The system of any one of Example Clauses H-M, wherein the one or more processors are further configured to execute instructions stored in the one or more memories to: adding the first user to a list of waiting users in response to a command received from the first user.

Example Clause O: A non-transitory computer readable medium storing instructions operable to cause one or more processors to perform operations comprising: activating, in response to a user input received at a first device associated with a first user, a user interface that enables the first user to transmit text-based chat messages to a second user; and in response to activating the user interface, displaying at the first device a video stream representative of the second user received from a second device associated with the second user.

Example Clause P: The non-transitory computer readable medium of Example Clause O, wherein the video stream representative of the second user indicates that the first user is engaged with another user in a one-on-one video session.

Example Clause Q: The non-transitory computer readable medium of Example Clause O or Example Clause P, wherein the operations further comprise: establishing a video communication session between the first device and the second device in response to a command received from the second device to terminate a one-on-one video session with another user.

Example Clause R: The non-transitory computer readable medium of any one of Example Clauses O-Q, wherein the operations further comprise: establishing a video communication session between the first device and the second device if the second user is not engaged in a one-on-one video session with another user.

Example Clause S: The non-transitory computer readable medium of any one of Example Clauses O-R, wherein the operations further comprise: in response to determining that the user interface is activated withing an availability schedule with respect to the second user, displaying the video stream at the first device.

Example Clause T: The non-transitory computer readable medium of any one of Example Clauses O-S, wherein the operations further comprise: displaying, in the user interface, an indication that other users are waiting to have one-on-one video sessions with the second user.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

activating, in response to a user input received at a first device associated with a first user, a user interface of a text-based messaging application that enables the first user to transmit text-based chat messages to a second user; and in response to activating the user interface, displaying at the first device a video stream representative of the second user received from a second device associated with the second user, wherein displaying at the first device the video stream comprises:

determining whether the second user is engaged in an other one-on-one video session; and in response to determining that the second user is engaged in the other one-on-one video session:

displaying the video stream without establishing an audio channel between the first device and second device; and displaying an indication that the second user is engaged with another user in a one-on-one video session.

2. The method of claim 1, wherein displaying at the first device the video stream comprises:

in response to an indication that the second user is not engaged in the other one-on-one video session, establishing an audio channel between the first device and the second device.

3. The method of claim 1, further comprising:

in response to an indication that the second user is available for a one-on-one video session, establishing a video channel between the first device and the second device.

4. The method of claim 1, further comprising:

determining that the first user meets one-on-one video session privileges with respect to the second user; and in response to determining that the first user meets the one-on-one video session privileges with respect to the second user, displaying the video stream at the first device.

5. The method of claim 1, further comprising:

displaying, in the user interface, an indication of a number of other users waiting to have one-on-one video sessions with the second user.

6. The method of claim 1, further comprising:

receiving a command from the first user indicating to add the first user to a list of waiting users; and adding the first user to the list of waiting users.

7. A system, comprising:

one or more memories; and one or more processors, the one or more processors configured to execute instructions stored in the one or more memories to:

activate, in response to a user input received at a first device associated with a first user, a user interface of a text-based messaging application that enables the first user to transmit text-based chat messages to a second user; and in response to activating the user interface, display at the first device a video stream representative of the second user received from a second device associated the second user, wherein to display at the first device the video stream comprises to:

determine whether the second user is engaged in an other one-on-one video session; and in response to determining that the second user is engaged in the other one-on-one video session:

display the video stream without establishing an audio channel between the first device and second device; and display an indication that the second user is engaged with another user in a one-on-one video session.

8. The system of claim 7, wherein the one or more processors are further configured to execute instructions stored in the one or more memories to:

display, in the user interface, a text message indicating that the first user is engaged with another user in a one-on-one video session.

9. The system of claim 7, wherein the video stream representative of the second user comprises a blurred version of a video stream obtained via a camera of the second device.

10. The system of claim 7, wherein the one or more processors are further configured to execute instructions stored in the one or more memories to:

establish a video communication session between the first device and the second device.

11. The system of claim 7, wherein the video stream is displayed at the first device in response to a determination that the first user meets one-on-one video session privileges with respect to the second user.

12. The system of claim 7, wherein the user interface includes an indication of a number of other users waiting to have one-on-one video sessions with the second user.

13. The system of claim 7, wherein the one or more processors are further configured to execute instructions stored in the one or more memories to:

adding the first user to a list of waiting users in response to a command received from the first user.

14. A non-transitory computer readable medium storing instructions operable to cause one or more processors to perform operations comprising:

activating, in response to a user input received at a first device associated with a first user, a user interface of a text-based messaging application that enables the first user to transmit text-based chat messages to a second user; and in response to activating the user interface, displaying at the first device a video stream representative of the second user received from a second device associated with the second user, wherein displaying at the first device the video stream comprises:

determining whether the second user is engaged in an other one-on-one video session; and in response to determining that the second user is engaged in the other one-on-one video session:

displaying the video stream without establishing an audio channel between the first device and second device; and displaying an indication that the second user is engaged with another user in a one-on-one video session.

15. The non-transitory computer readable medium of claim 14, wherein the video stream representative of the second user indicates that the first-second user is engaged with another user in a one-on-one video session.

16. The non-transitory computer readable medium of claim 14, wherein the operations further comprise:

establishing a video communication session between the first device and the second device in response to a command received from the second device to terminate a one-on-one video session with another user.

17. The non-transitory computer readable medium of claim 14, wherein the operations further comprise:

establishing a video communication session between the first device and the second device if the second user is not engaged in a one-on-one video session with another user.

18. The non-transitory computer readable medium of claim 14, wherein the operations further comprise:

in response to determining that the user interface is activated within an availability schedule with respect to the second user, displaying the video stream at the first device.

19. The non-transitory computer readable medium of claim 14, wherein the operations further comprise:

displaying, in the user interface, an indication that other users are waiting to have one-on-one video sessions with the second user.

20. The method of claim 1, further comprising:

in response to determining that the user interface is activated within an availability schedule with respect to the second user, displaying the video stream at the first device.

\* \* \* \* \*